July 5, 1938. J. L. WEINER 2,123,031
THERMOS CARRIER
Filed Aug. 3, 1936
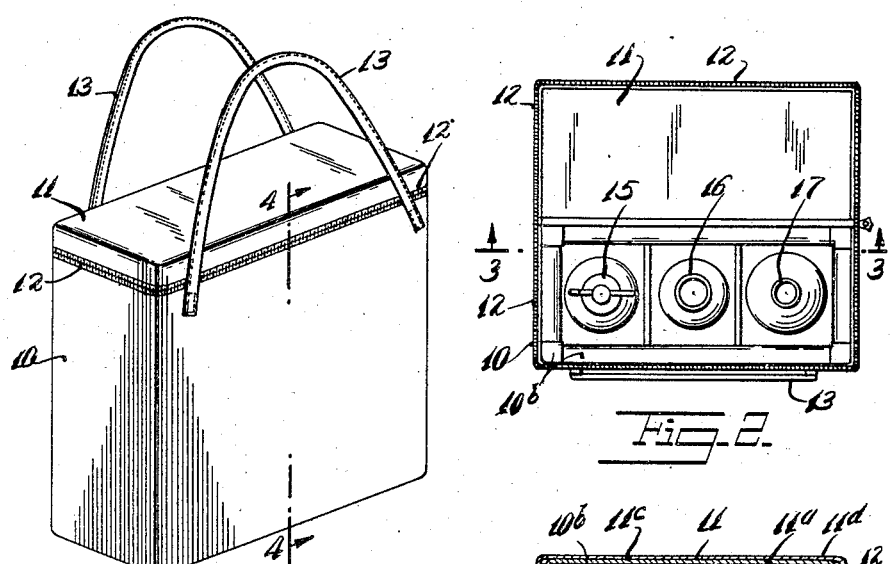
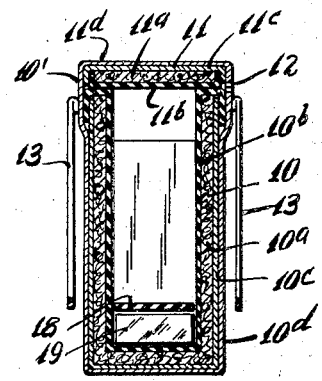
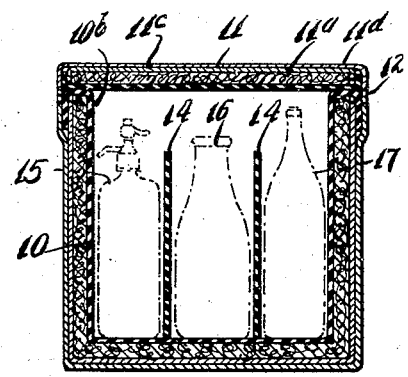
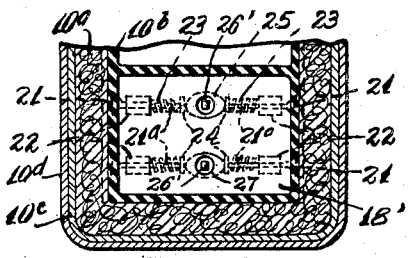
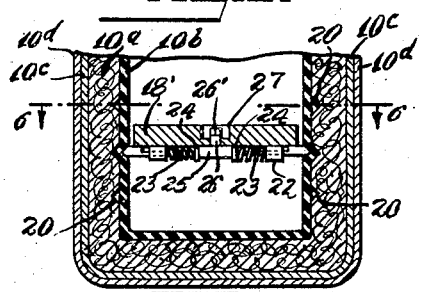
INVENTOR
Julius Leon Weiner
BY
ATTORNEY Patented July 5, 1938

2,123,031

UNITED STATES PATENT OFFICE 2,123,031

THERMOS CARRIER

Julius Leon Weiner, New York, N. Y.

Application August 3, 1936, Serial No. 94,008

4 Claims. (Cl. 224—45)

This invention relates to new and useful improvements in a thermos carrier.

The invention has for an object the construction of a thermos carrier which is characterized by a box shaped container and cover associated therewith, and including heat insulating material. With this construction it is possible to store various bottles of beverages and other material within said carrier for maintaining their initial temperatures.

A further object of the invention resides in providing the carrier with unbreakable external material so that if the carrier is accidentally dropped there will be little or no damage to it, especially to the contents contained therein.

Still further the invention proposes to provide an arrangement whereby when the cover of the carrier is closed, the interior thereof is hermetically sealed and so prevents the radiation of air from the interior to the atmosphere with a consequent change in temperature.

A further object of the invention resides in the provision of rubber or the like partitions within the carrier for dividing off compartments, and prevents the various bottles from breaking when the carrier is roughly handled.

Another object resides in the provision of a shelf element and an arrangement whereby the shelf element may be fixed in various positions in the carrier to divide off compartments of different sizes.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a perspective view of a thermos carrier constructed according to this invention.

Fig. 2 is a plan view of Fig. 1 illustrated with the cover open.

Fig. 3 is a sectional view as though taken on the line 3—3 of Fig. 2 but illustrated with the cover closed.

Fig. 4 is a transverse sectional view taken on the line 4—4 of Fig. 1.

Fig. 5 is a view similar to Fig. 4 but illustrating a modification of the invention, and Fig. 6 is a sectional view taken on the line 6—6 of Fig. 5.

The thermos carrier, according to this invention, comprises a box shaped container 10 and a cover 11 associated therewith, each of these parts including heat insulating material 10<sup>a</sup> and 11<sup>a</sup>, respectively. The container 10 has an inner wall lining 10<sup>b</sup> of waterproof soft material, preferably sheet rubber. The outer surface of the container 10 is covered with a layer of sheet metal material 10<sup>c</sup> over which there is secured a layer of canvas or other cloth material 10<sup>d</sup>. The container 10 may also be manufactured with uncovered metal with any suitable finish on its outer surface.

The cover 11 is very similar in design to that of the container. The inner face of the cover has sheet rubber material 11<sup>b</sup> which is adapted to engage against portions of the material 10<sup>b</sup> for hermetically sealing the container when the cover is closed. The cover 11 also has an outer layer of metallic material 11<sup>c</sup> which is covered by a layer of canvas or other cloth material 11<sup>d</sup>. This cloth material 11<sup>d</sup> preferably is a continuation of the cloth material 10<sup>d</sup> at one side of the container, namely, the side 10' and forms a hinge for the cover. The remaining three sides are provided with hook fasteners 12 by which the cover may be closed.

A pair of straps 13 are attached to the container 10 by which it may readily be carried. Several partitions 14 are formed within the container dividing off compartments for various objects. For example, there may be a compartment for a bottle of seltzer 15, a bottle of milk 16, and a bottle of water or soda 17. For each compartment a small shelf element 18 is provided which may be rested upon refrigerating material 19 placed into the compartment. This refrigerating material may be carbon dioxide snow or ice, etc.

In Figs. 5 and 6 a modified form of the invention has been disclosed in which a shelf element 18' is shown which may be supported in various elevated positions in a novel manner. More particularly, opposed walls of the container are formed with a plurality of horizontal and spaced grooves 20. These grooves are normally hid from view by the sheet rubber material 10<sup>b</sup>. The sheet rubber material normally merely extends over the grooves 20 so that when the inner wall of the receptacle is viewed it is absolutely straight.

Several slidable elements 21 have stem portions 21<sup>a</sup> which slidably engage through standards 22 mounted on the bottom face of the shelf element 18'. Springs 23 act between the standards 22 and are coaxial on the stems 21 and act against head elements 24 formed upon the outer ends of the stems for normally retracting the elements 21. The head elements 24 are forced against cams 25 which are fixed to stems 26 rotatively mounted in the shelf element 18'. The upper ends 26' of these stems are square in transverse cross section and disposed within recesses 27 in the top face of the shelf element.

The stems 26 may be turned so that the cams 25 move the holding elements 21 outwards and force portions of the rubber layer 10b into certain of the grooves 20 for holding the shelf elements in fixed positions. The cams 25 may be turned to other positions in which the springs 23 will retract the holding elements 21.

The vertical partitions 14 may extend to cover 11 and be of heat insulating material to permit the keeping of the various compartments in the thermos carrier at different temperatures.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. In a thermos carrier, a container having substantially horizontal grooves along the inner faces of the side walls, a lining material for the inside of said container and having bendable portions normally engaging over said grooves, a shelf slidably mounted within said container, bearings fixedly mounted on the underside of said shelf, bar elements slidably mounted in said bearings, resilient means on said bar elements for normally urging them inward, and cam elements adapted to engage the inner end of said bar elements and having a key portion thereof extending through said shelf by which they may be turned to extend said bar elements against the normal action of said resilient means to force the bendable portions of said lining of material into said grooves so that said bar elements maintain their extended position holding said shelf in place.

2. A water-proof heat insulating portable box comprising, in combination with a container and top having inner linings of sheet rubber and intermediate linings of thermal insulating material, a removable shelf mounted in said casing, said shelf having at least one bar slidably attached thereto, said bar being slidable between two positions, in one of which the end of said bar extends beyond the edge of said shelf to engage the inside of said box, spring means for normally urging said bar to retract to its other position, and a cam having a control accessible from the top of said shelf for forcing said bar to an extended position.

3. A device as set forth in claim 2, the intermediate lining of said container being provided with a recess on the side adjacent the sheet rubber lining, into which the end of said bar may engage, said rubber lining being bent into said recess by said bar whereby a smooth surface is presented by said rubber lining when said shelf is removed.

4. In a thermos carrier, a container having substantially horizontal grooves along the inner face of the side walls, a lining material for the inside of said container and having bendable portions normally engaging over said grooves, a shelf slidably mounted within said container, bearings fixedly mounted on the underside of said shelf, bar elements slidably mounted in said bearings, resilient means on said bar elements for normally urging them inwards, and cam elements adapted to engage the inner end of said bar elements and having a key portion thereof extending through said shelf by which they may be turned to extend said bar elements against the normal action of said resilient means to force the bendable portions of said lining material into said grooves so that said bar elements maintain their extended positions holding said shelf in place, said resilient means, comprising springs on said bar elements acting between headed portions on the inner ends of said bar elements and said bearings.

JULIUS LEON WEINER.